United States Patent [19]
Reid

[11] 4,157,017
[45] Jun. 5, 1979

[54] CONTINUOUS PREPARATION OF SOFT, MELT-RESISTANT, FROZEN CONFECTION

[75] Inventor: Scott F. Reid, 2110 Birchwood Dr., Reynoldsburg, Ohio 43068

[73] Assignees: Betty Jane Reid; Betty Jane Reid and Scott F. Reid, all of Reynoldsburg, Ohio ; as trustees for Linda Marie, Jeffrey Alan and Michael David Reid

[21] Appl. No.: 661,496

[22] Filed: Feb. 26, 1976

Related U.S. Application Data

[63] Continuation-in-part of Ser. No. 346,436, Mar. 30, 1973, abandoned.

[51] Int. Cl.² .............................................. A23G 9/00
[52] U.S. Cl. ....................................... 62/135; 62/306; 261/89; 426/474
[58] Field of Search ...................... 62/69, 70, 306, 121, 62/211, 135, 138; 261/89; 426/317, 164, 474, 524, 319; 236/78 B

[56] References Cited
U.S. PATENT DOCUMENTS

| | | | |
|---|---|---|---|
| 2,290,214 | 7/1942 | Smith, Jr. ........................... | 62/70 X |
| 2,304,579 | 12/1942 | Lindsey .............................. | 62/75 X |
| 2,337,410 | 12/1943 | Peters .......................... | 236/15 BC X |
| 2,651,186 | 9/1953 | Murphy .............................. | 62/70 X |
| 3,044,878 | 7/1962 | Knedlik .................................. | 62/306 |
| 3,409,217 | 11/1968 | Gentry ............................ | 236/15 BC |
| 3,556,496 | 1/1971 | Hucke .......................... | 236/15 BC X |
| 3,802,217 | 4/1974 | Garavelli .............................. | 62/306 |

Primary Examiner—William E. Wayner
Attorney, Agent, or Firm—Barker, Emch, Schaffer & Todd

[57] ABSTRACT

Closed flow-through apparatus and method for gassifying a dairy-type confection mix by applying a pressure head of nitrous oxide to an enclosed receptacle and projecting the mix into the receptacle and atomizing it therein. Atomization is accomplished by projecting a stream of said mix against a surface in said receptacle or toward a rapidly driven impeller. A metered quantity of an edible refrigerant, such as Freon 115, is also distributed into the mix. After gassification, the saturated mix is vented under the pressure of the pressure head into a freezing chamber which is provided with a valved outlet and a motor driven dasher. A control circuit provides an automatic mode as well as a wash cycle and a dasher drive mode.

6 Claims, 7 Drawing Figures

CONTINUOUS PREPARATION OF SOFT, MELT-RESISTANT, FROZEN CONFECTION

BACKGROUND OF THE INVENTION

This application is a continuation in part of my co-pending application Ser. No. 346,436, filed Mar. 30, 1973, and now abandoned.

The invention relates to the manufacture of a soft, melt-resistant, frozen confection by means of a continuous, closed apparatus.

In the past, it has been known that desirable frozen confections may be made by admixing a suitable gas with an ice cream or confection mix. Such mixes are common in the trade and have, as their principal ingredient, a milk or milk derivative. Of course, suitable synthetic mixes may be also used. For purposes of this invention, a confection mix may additionally include fruit flavoring, sweetening, carbonated or alcoholic beverages or other ingredients. Additionally, other materials having characteristics similar to those of a conventional mix may also be used with the present invention.

Dependent in part on the specific ingredients and the consistency or relative degree of solidification, frozen confections may be called ices, sherberts, slushes, ice milk, frozen custards, mousses, shakes, ice cream or by names of similar significance.

The admixture of a gas with the mix is known to produce a confection which, upon being processed in a ice cream type freezer, exhibits a soft consistency which may, if desired, be directly dispensed from the freezing chamber into an ice cream cone, serving dish or the like for immediate consumption. This admixture of the frozen confection mix with a gas is done for the purpose of expanding the volume of the mix so that when the mix is frozen it is softer than it would be in the absence of gas and has a consistency which is dependent in part upon the quantity of admixed gas. Additionally such expansion provides an increased volume of marketable product.

The most conventional manner of mixing a gas into a mix is to partially fill an enclosed receptacle with a liquid confection mix and filling the remainder of the receptacle with a suitable gas. Air is the most commonly used gas for this purpose. The entire contents of the receptacle are then agitated, stirred or beat or the entire receptacle is shaken in order to mix the gas into the liquid mix. Such methods and apparatus are shown in U.S. Pat. Nos. 3,004,404; 1,548,430; 2,290,214; 2,343,767; 2,294,172; and 2,713,253.

A modification of this method is shown in U.S. Pat. No. 2,409,067 in which the liquid mix is sprayed into a contained atmosphere of a suitable gas which is under a reduced pressure. Expansion of the liquid mix permits some gassification of the liquid. The entire contents is then agitated to complete the admixture.

Another system, such as shown in U.S. Pat. Nos. 3,656,316 and 3,503,757, injects the gas into a pipe through which the confection mix is flowing. Still another system, such as illustrated in U.S. Pat. Nos. 2,651,186 and 2,064,597, sprays the confection mix directly into a freezing chamber.

There are other systems for incorporating a gas into various liquids particularly in the carbonated soft drink industry. Examples of these systems are shown in the following U.S. Pat. Nos. 3,642,174; 3,044,878; 3,341,468; 2,306,714; and 2,657,024. However, these do not apply to the ice cream making art because in the gassification of an ice cream mix the gas is adsorbed as large groupings of gas molecules clustered around groupings of molecules of mix rather than being dissolved into the liquid as occurs in carbonation in the soft drink industry.

Frozen confections which have been gassified, particularly those having a relatively softer consistency, have conventionally exhibited an undesirable tendancy to melt readily. Consumers prefer that a frozen confection remain in a stable, frozen state, especially in cones, so that it does not drip.

Another problem which has been bothersome in the soft ice cream industry is the economic feasibility of maintaining a sufficiently low bacterial count within the ingredients in order to satisy health requirements. Batch systems are the most difficult to control because they must be repeatedly opened and exposed to the air in order to be refilled and to transfer the batch processed contents. Consequently, such a system must be cleaned and washed at least daily.

There is therefore a need for a closed, continuous flow through system which can retain both mix and processed confection for long periods of time with a low bacteria count. There is further a need for an apparatus and process for improving the adsorption rate of gas into the liquid mix, for increasing the proportion of adsorbed gas and for providing a continuous process which may be intermittently interrupted or halted in correspondence with the intermittent withdrawal of finished product.

OBJECTS AND SUMMARY OF THE INVENTION

Accordingly it is an object of the present invention to provide a frozen confection apparatus which can be housed in a relatively small cabinet and operated with a totally closed flow through system thereby maintaining improved cleanliness and reduced bacteria level and further providing more efficient use of ingredients and requiring reduced labor and maintenance.

Another object of the invention is to provide a frozen confection apparatus and method which manufactures a gastromonically improved soft and melt resistant frozen confection having greater overrun and a more desirable consistency.

It is another object of the present invention to provide a method and apparatus having improved gas adsorption for use in the gassification of a dairy-type confection mix prior to conveying the mix into the freezing chamber.

It is still a further object of the invention to incorporate an edible, evaporative coolant or refringerant into the mix for stabilizing the consistency of the dispensed frozen confection by cooling it further after it has been dispensed to atmospheric pressure.

It is still another object of the present invention to provide a freezing chamber which accomodates a temperature gradient in a continuous freezer thereby effectively maintaining the desired product consistency without unnecessary operation of the refrigeration equipment.

It is yet another object of the present invention to provide a frozen confection apparatus which may be easily and effectively cleaned by substituting a suitable cleaner for the confection mix.

The invention contemplates pumping a dairy-type confection mix into an enclosed saturator receptacle upon which a continuous pressure head of gas is maintanined and projecting the mix into the receptacle to atomize it therein in order to effect its gassification. The gassified mix preferably is mixed with an evaporative coolant and then is vented into a freezing chamber, frozen, and dispensed.

Further objects and features of the invention will be apparent from the following specification and claims when considered in connection with the accompanying drawings illustrating the preferred embodiments of the invention.

Figure 1:
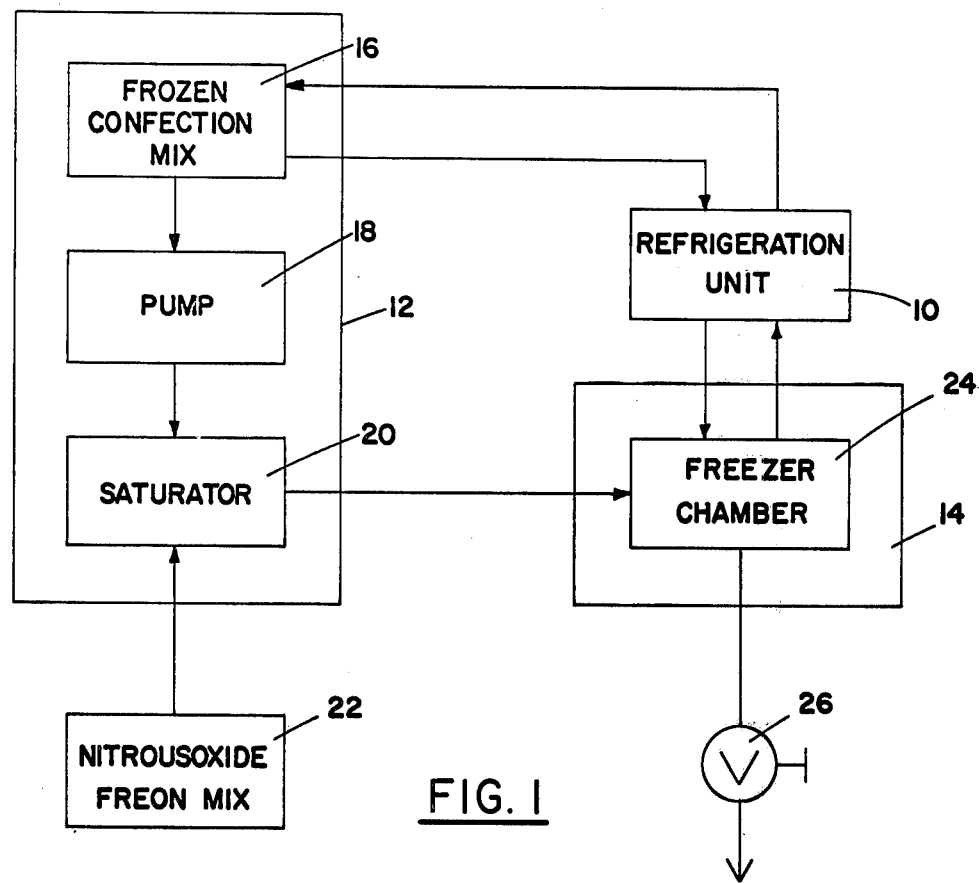
FIG. 1 is a block diagram illustrating an alternative embodiment of the present invention.

In describing the embodiments of the invention illustrated in the drawings, specific terminology will be resorted to for the sake of clarity. However, it is not intended to be limited to the specific term so selected and it is to be understood that each specific term includes all technical equivalents which operate in a similar manner or accomplish similar purposes.

DETAILED DESCRIPTION

The detailed description is divided into two segments which are first, the portion describing the original and now alternative embodiment of the invention and second, the segment describing the improved and preferred embodiments of the present invention.

A. The Original Embodiment

The original and now alternative embodiments of the invention may be described in general terms with reference to FIG. 1. An electrically energized refrigeration unit 10, of a type commercially available, is connected to maintain a refrigerated compartment 12 and an ice cream type freezer 14 at suitably reduced temperatures. An ice cream type freezer is a refrigerated freezing chamber having a drivable dasher for circulating the freezing mix. The dasher also softens any frozen confection which may have become rigid from remaining stationary too long. Advantageously, the dasher is formed with impellers to help move the frozen confection toward the outlet of the freezing chamber.

The refrigerated compartment 12 is maintained at a sufficiently low temperature for health purposes, so that bacteria growth is inhibited. However, the temperature must be sufficiently high so that the mix remains a liquid to permit it to flow during the manufacturing operations. Similarly, the ice cream type freezer 14 is maintained at a temperature which is suitable not only for inhibiting bacteria growth but also for manufacturing an ice cream type product of the desired consistency.

Contained within the refrigerated compartment 12 are a source or reservoir 16 of a confection mix and a pump 18 for at times, upon demand, pumping the confection mix into a saturator 20. The saturator 20 is connected in communication with a tank, cylinder or other container 22 of a gaseous mixture and functions to mix or saturate the liquid confection mix with gas from the gas container 22.

The saturated mix from the saturator 20 is delivered to the freezer chamber 24 of the ice cream type freezer 14 where it is processed into a frozen confection. This confection may be intermittently drawn off for consumption by operation of a valve 26.

Figure 4:
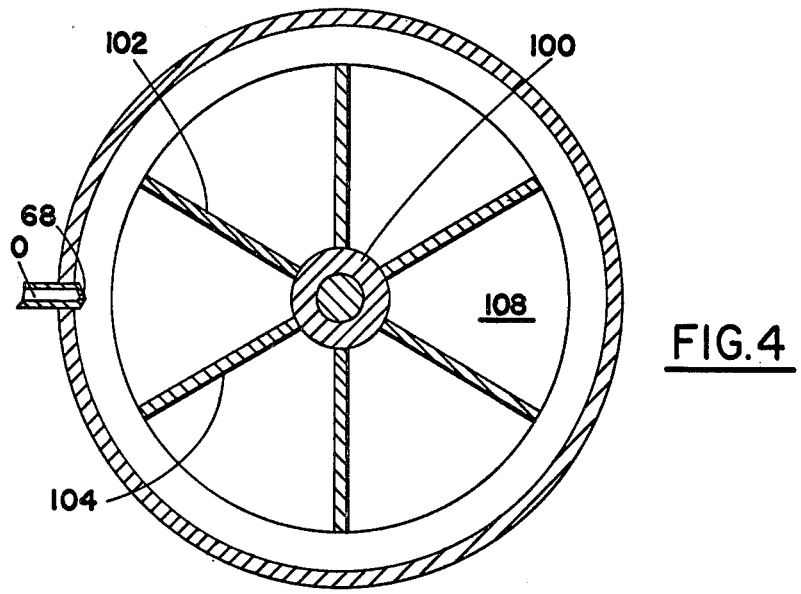
FIG. 4 is a view in horizontal section illustrating the detail of the impeller and mix inlet structure utilized in an alternative saturator embodying the present invention.
Figure 2:
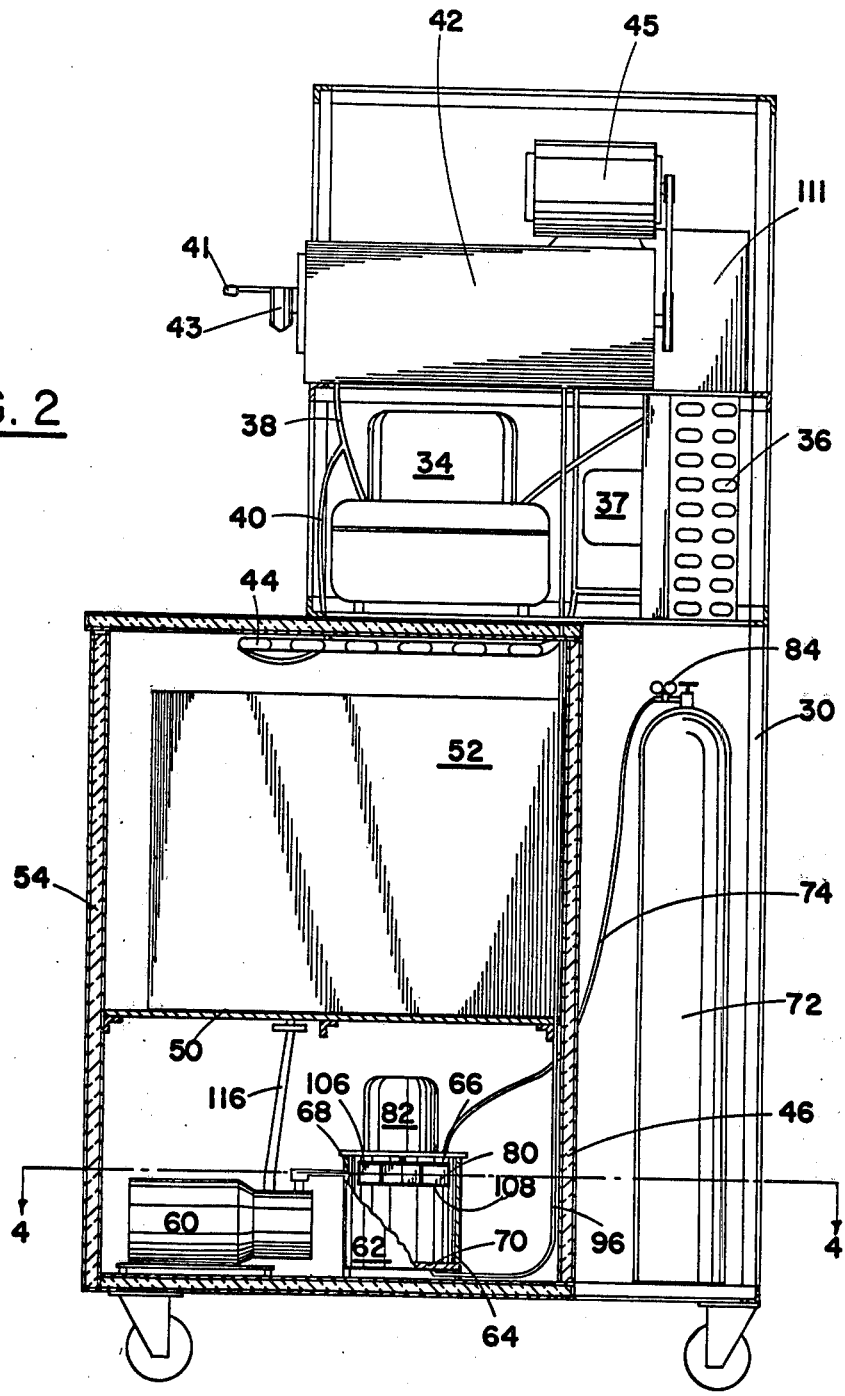
FIG. 2 is a view in vertical section of an alternative embodiment of the present invention.
Figure 3:
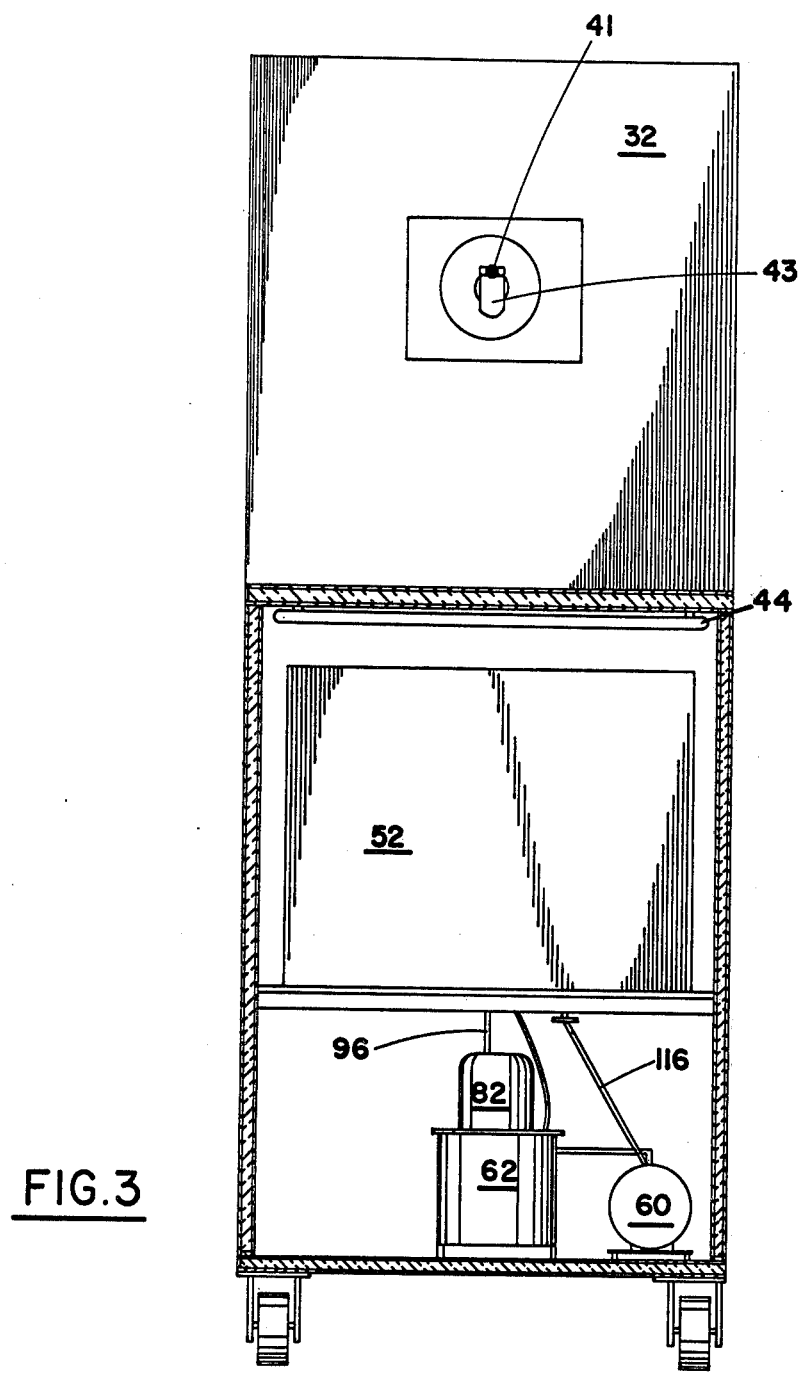
FIG. 3 is a vertical section of the embodiment of the invention illustrated in FIG. 2.

FIGS. 2, 3, and 4 illustrate the alternative embodiment of the invention in more detail. This embodiment is constructed within a suitably sturdy support frame 30 constructed of, for example, butt welded stainless steel to which an exterior skin or cover panels, such as panel 32, are fastened. Preferably, these panels are constructed of stainless steel. Mounted within the frame 30 is a conventional refrigeration unit which comprises a compressor 34 connected to a condenser 36 suitably vented to the exterior rear of the support frame 30. The condenser 36 is air cooled by a fan 37. The compressor 34 supplies compressed refrigerant through conduits 38 and 40 to the helical coils surrounding an ice cream type freezing chamber 42 and to the refrigerating coils 44 within a refrigerated housing 46. The refrigerated housing 46 is conventionally insulated and is provided with an intermediate shelf 50 upon which a confection mix source, such as a five gallon bag or box type carton 52 containing the confection mix, may be removably set. The refrigerated compartment 46 is also provided with a pivotal front door 54 hingedly mounted to the support frame 30 which may be opened from the front of the machine for replacement of the mix carton 52 or for servicing the other contents of the refrigerated compartment 46.

The interior freezing chamber of the ice cream type freezer conventionally contains a dasher which is driven by a belt connected motor 45.

An electrically driven pump 60, operable at 30 psi for example, is connected by liquid conveying conduits to the mix container 52 and to a saturator 62 mounted within the refrigerated compartment 46. The saturator 62 comprises a pressure sealed container 64 having a gas inlet 66, a confection mix inlet 68 and a saturated mix outlet 70. A pressurized receptacle 72, such as a G cylinder, containing a suitable gas mixture is connected through a conduit 74 to the gas inlet 66 for communication with the interior of the pressure sealed container 64. Rotatably mounted within the container 64 is an impeller 80 which is drivingly connected to an electric motor 82 rated, for example, at one sixth horsepower for rapidly and rotatably driving the impeller 80. The impeller 80 is juxtaposed from the mix inlet 68 so that when the pump 60 supplies confection mix through the mix inlet 68, the mix will be injected toward the impeller 80.

The electrically actuated pump 60 together with a regulator 84 on the gas receptacle 72 control the liquid mix flow so that a predominantly gas atmosphere is maintained around the impeller 80, around the mix inlet 68 and between the impeller and the mix inlet. The pump 60 and the impeller motor 82 are responsive to the operation of a conventional type floating level detector which detects the quantity of a saturated mix settled in the saturator 62. A switch is also provided on a draw valve 43. The draw valve switch is closed when the draw valve 43 is opened for dispensing the frozen confection as desired by moving the lever 41.

Preferably, the pump motor 60 and the impeller motor 82 are parallel connected and are together controlled by and series connected with the draw valve operated switch, a source of electrical power and a switch operated by the level detector. The level detector switch closes when the saturated mix level falls below a selected level. Therefore, whenever the draw valve is operated and the saturated mix level is below the selected level, the pump 60 and the saturator motor 82 begin operating. Of course equivalent connections, using solenoids for example might alternatively be used.

As described below, confection mix which is injected toward the impeller 80 from the inlet 68 is broken into a mist of droplets which settle to the bottom of the pressure sealed container 62 and in doing so adsorb suitable quantities of gas. This admixture of liquid and gas is exhausted through the outlet 70 and delivered through a conduit 96 to the ice cream type freezer 42.

The one principal part of this embodiment of the invention is the saturator 62. In particular, it has been found that improved saturation of the liquid is accomplished by the manner in which the liquid is treated in the saturator 62 as described below. The impeller is illustrated in FIG. 4 and comprises a central hub 100 which is fixed to the drive shaft of motor 82. A plurality of radially extending vanes such as vanes 102 and 104 extend generally outwardly from the hub 100. Preferably these vanes are a plurality of plates which are fastened at their upper and lower edges between a pair of circular disks 106 and 108.

The liquid mix inlet 68 may advantageously be made from a conduit or tube 110 which is crimped at its interior end to provide a simple spray nozzle.

All food contacting parts of the apparatus are constructed of materials which are appropriately inert and sanitary. An electrical, central control box 111 houses appropriate fuses and switches. Wires (not shown) are threaded within the interior of the support frame for supplying power to the electrical motors as described above.

Operation of this embodiment must be preceeded by the installation of a suitable container 52 containing a confection mix. By confection mix is meant a dairy-type material which is suitable for being manufactured or processed into a frozen confection.

Confection mix container 52 is installed in the refrigerated compartment 46 and connected to the conduit 116 for delivery to the pump 60. Similarly, the gas receptacle 72 containing pressurized gas is connected to the conduit 74 for maintaining a pressurized atmosphere of such gas within the saturator 62. It has been found that the preferred gas mixture comprises approximately 90% nitrous oxide and 10% nontoxic evaporative refrigerant. A preferred evaporative refrigerant has been found to be food grade Freon 115, (chloropentafluorethane). Freon C-318 (octafluorocyclobutane), might be used.

The regulator 84 is preferably adjusted to maintain the gas atmosphere in the saturator 62 in the range of substantially 25 psi to 30 psi preferably at a nominal value of 27 psi.

The refrigerated compartment 46 is maintained substantially in the temperature range of 34 degrees F. to 42 degrees F. and preferably at a nominal 37 degrees F.

Withdrawal of a substantial amount of frozen confection by operation of the hand lever 41 to actuate the valve 43 will initiate energization of the pump 60 and the impeller motor 82. The pump 60 will thereupon begin injecting the confection mix from the mix container 52 toward the rotatably driven impeller 80.

The rapid rotation of the impeller 80 causes a similar, turbulent rotation of the surrounding atmosphere. The result is that some of the liquid mix injected from the inlet 68 strikes the impeller and is immediately broken into a mist of tiny droplets. A portion of the injected liquid mix never reaches the impeller itself, being broken up into the mist of small droplets by the turbulent, circularly driven atmosphere.

The injection of the confection mix toward the impeller effects the breaking of the mix into a mist of droplets which pass through the gas atmosphere within the saturator 62 as they fall to the bottom of the pressurized container 64.

The small size of these droplets, which result from this splattering and whirlwind effect, greatly increases the surface area of the liquid mix which is exposed to the gas atmosphere. Gas adsorption is consequently improved and may be as much as 500% but is preferably 80%–100% for an ice cream product.

The gas pressure which is maintained within the saturator 62 also serves to force the liquid gas admixture out of the outlet 70. In this manner, the liquid gas admixture is withdrawn from the saturator 62, conveyed to the ice cream type freezer 42 and there frozen into a desired frozen confection. The freezer 42 is always maintained with a substantially full charge since gas pressure is always present.

B. The Preferred Embodiment

Figure 5:
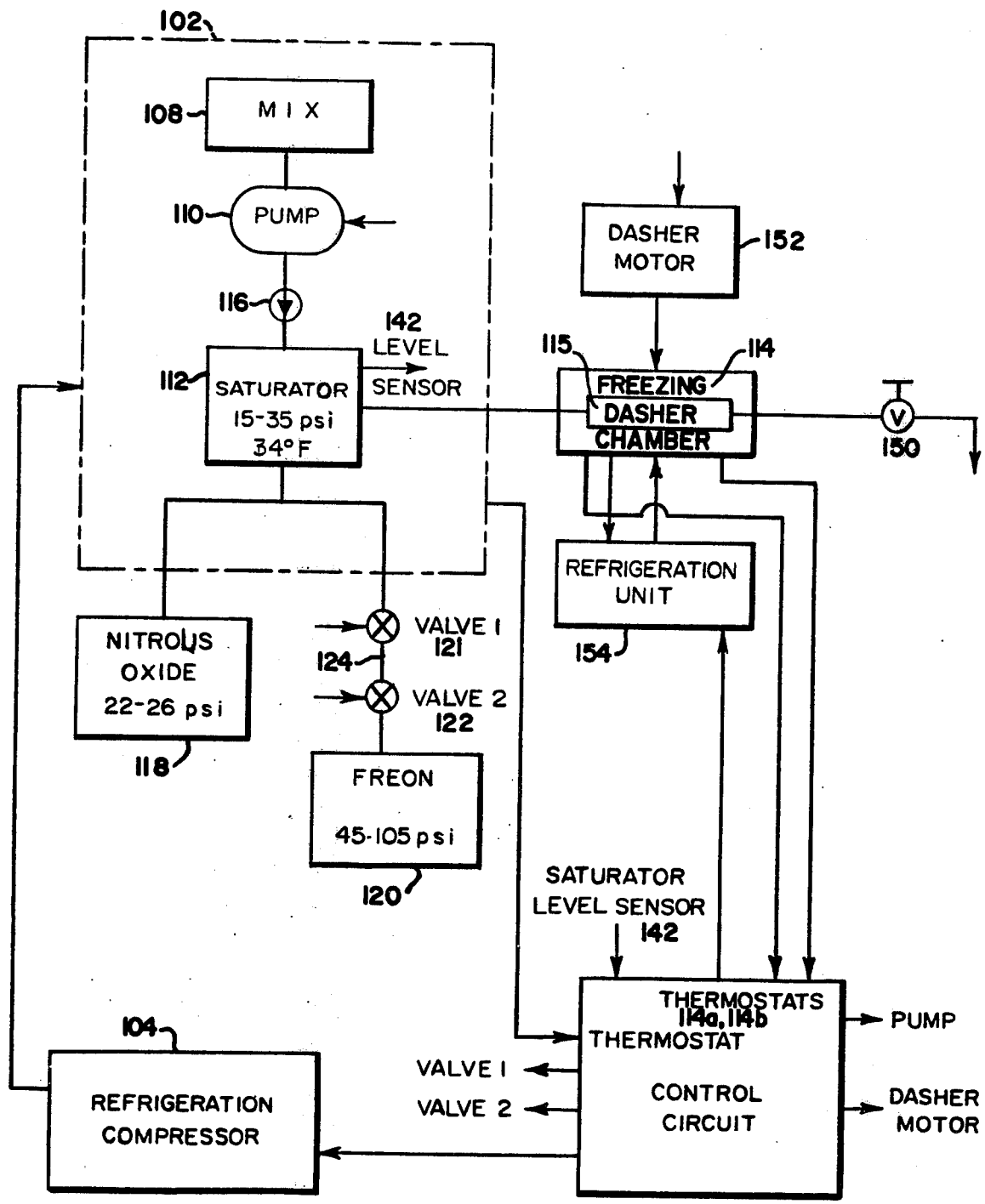
FIG. 5 is a block diagram illustrating the preferred embodiment of the invention.

Referring now to FIG. 5, the preferred embodiment of the invention has an insulated, refrigerated enclosure 102 which is supplied with compressed refrigerant from compressor 104 upon actuation by the control circuit 106. The refrigeration compressor units which are utilized in the present invention are conventional off-the-shelf units. These units have compressor motors which can be energized through thermostats mounted adjacent the structure to be cooled. The units also have expansion valves which are controlled by an internal thermostat system which is responsive to the temperature of the refrigerant as it exits from the evaporation chamber. Preferably the insulated and refrigerated enclosure 102 is maintained at a temperature of 34 degrees F.

Contained within the insulated enclosure 102 are a mix receptacle 108, a motor driven pump 110 and a saturator 112. The motor for driving the pump 110 is mounted outside the enclosure 102 to avoid the unnecessary introduction of heat into the enclosure 102. The receptacle of mix 108 contains the liquid dairy-type confection mix and may be a five gallon bag or box.

The pump 110 is connected to the mix receptacle 108 and operates to project liquid mix from the mix receptacle 108 into the saturator 112. Since a pressure head is maintained upon the interior of the saturator 112, in a manner subsequently described, the pump 110 must be capable of an output pressure which is sufficient to overcome the pressure head and to project the mix into the saturator. I have found that a pump having a maximum output pressure capacity of 45 psi is sufficient.

The satuator 112 comprises an enclosed receptacle which is connected to the pump 110 and functions to atomize and gassify the confection mix projected into the saturator 112 prior to transfer of the gassified mix to a subsequent freezing chamber 114. Preferably a ball check valve 116 is provided at the inlet to the saturator 112 in order to prevent any reverse flow of mix or any escape of gas because of the continuous pressure head maintained upon the interior of the saturator 112.

A source of pressurized gas, preferably nitrous oxide, is connected in communication with the interior of the saturator 112 for continuously applying a pressure head upon the interior. It is therefore the primary function of the saturator to gassify the mix with the gasses in the source 118 and the source 120.

It should be pointed out that the gassification of a dairy-type confection mix differs appreciably from the carbonation of water or similar liquids. Carbonation involves the dissolving of $CO_2$ molecules in the liquid. The carbonated liquid is not appreciably expanded in volume and has a consistency essentially the same as the uncarbonated liquid. However, in the gassification of a dairy-type confection mix, large masses or clusters of gas molecules are adsorbed about large masses or clusters of mix molecules. It is these microscopic pockets of gas which cause the desirably soft consistency in the frozen confection mix and which expand its volume. It is this difference in gassification mechanism which makes the gassification of a dairy-type confection mix difficult, critical and different from the carbonation of water.

A pressurized source of an edible evaporative coolant or refrigerant 120 is connected to the interior of the saturator 112 through a pair of solenoid actuated valves 121 and 122 which are in series fluid connection. The valves 121 and 122 together with their interposed pipe function as a metering means for adding a selected quantity of the refrigerant to the saturator upon instruction from the control circuit 106. The metering function is accomplished by periodically closing valve 1 and opening valve 2 in order to charge the pipe 124 connected intermediate these valves. Thereupon valve 1 is opened and valve 2 is closed so that the charge in the pipe 124 may be expelled into the saturator 112, being propelled by its substantially greater pressure.

The Freon or other edible refrigerant which is ulitized as the refrigerant source 120 is selected so that it has a boiling temperature at atmospheric pressure which is less than the melting point temperature of the mix and desirably is less than the temperature of the exhausted product. With this characteristic, minute quantities of the refrigerant in the dispensed confection evaporate after the product is dispensed so that its heat of vaporization serves to cool the surface of the dispensed confection. This cooling retards melting and provides a product with a firm ice cream consistency. In fact an ice cream cone immediately after dispensing initially exhibits a considerably chilled outer surface. After being exposed to room temperature it will not begin surface melting for five to ten minutes.

The preferred refrigerant 120 is a commercially available halogenated hydrocarbon sold under the trade name FREON 115. It is desirably applied to the valve 122 at tank pressure of 45–105 psi. I have found it preferable to distribute within the mix of the saturator approximately 1 cubic millimeter of Freon 115 per pint of confection mix.

Saturator 112 is maintained under a continuous pressure head by the nitrous oxide 118. Preferably this pressure head is in the range of 15–35 psi and most desirably is in the range of 22–26 psi.

It should be noted that these parameters of operation, as well as the additional parameters of operation subsequently disclosed, are somewhat interdependent within their ranges of operation. Changes in some parameters can be compensated for or offset by changes in other parameters. Additionally, variations in parameters may cause variations in the manufactured product. For example, a nitrous oxide head pressure of 30 psi will tend to produce a product having characteristics similar to malted milk shakes. Similarly, if the nitrous oxide head pressure is increased to approximately 35 psi, the product will be similar to whipped cream. Consequently, the greater one head pressure applied to the saturator the lighter and more expanded the dispensed product will be.

All gasses which are used are sterile so that they do not introduce bacteria into closed continuous flow through system. This extends the time interval between necessary cleaning of the equipment considerably beyond the shorter interval for systems which draw in ambient air.

Figure 6:
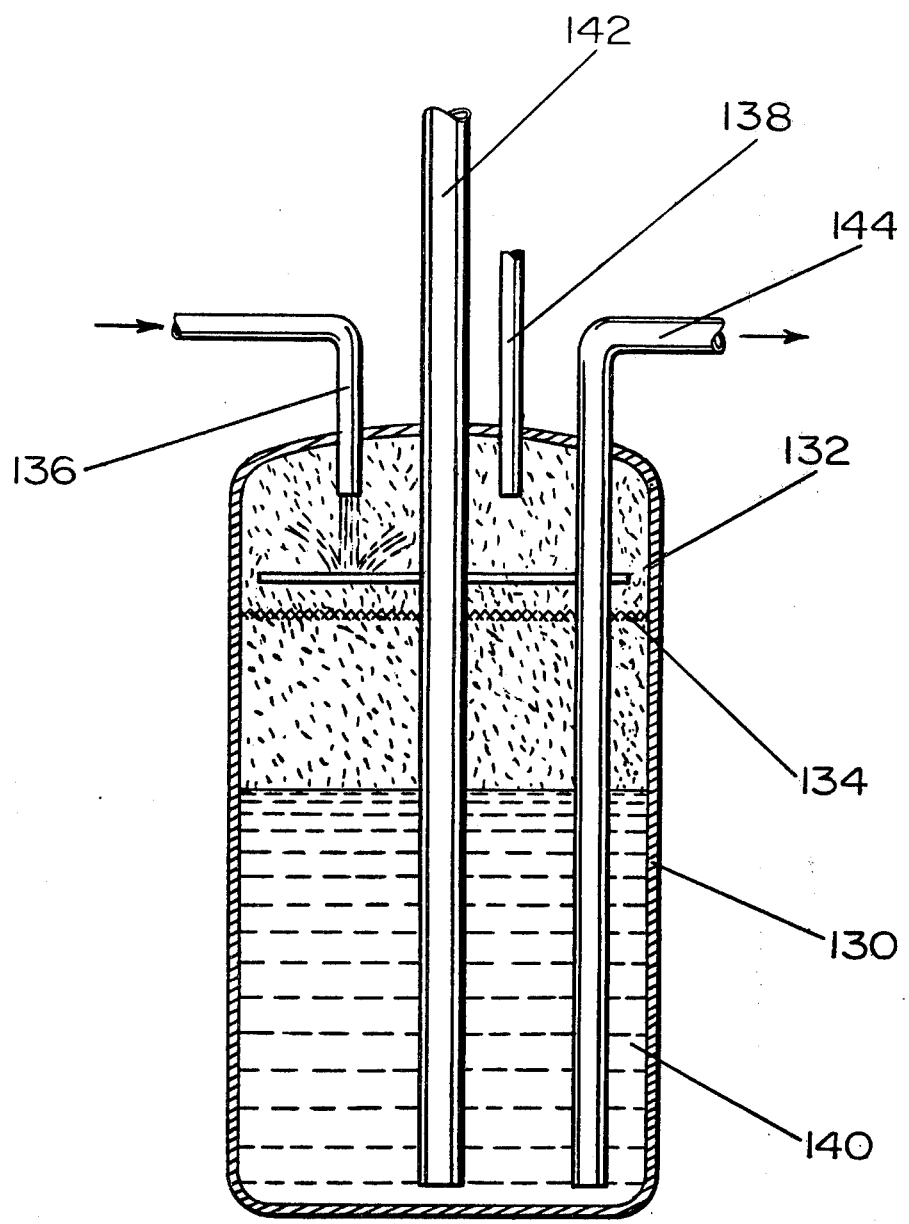
FIG. 6 is a view in vertical section of a saturator used in the preferred embodiment of the invention.

FIG. 6 illustrates the preferred saturator. It comprises an enclosed, cylindrical receptacle 130 which is vertically oriented as illustrated. In the upper portion of the receptacle 130 there is mounted a horizontally aligned, circular, splash plate 132 having its exterior edge spaced from the interior wall of the receptacle 130. Beneath the splash plate 132 there is supported a fine mesh screen 134 which extends to the interior walls of the receptacle 130.

The splash plate 132 provides an upper stationary surface against which the incoming confection mix may be projected from an inlet tube 136. The pump 110 of FIG. 5 projects the incoming confection mix against the surface at a sufficient velocity to effect its atomization upon striking the surface. Since a pressure head of nitrous oxide or other suitable gas is maintained in the upper portion of the saturator receptacle 130 through a gas inlet tube 138, the atomized mist settles downwardly within the saturator receptacle and collects in its lower portion as a gassified mix 140. The mix inlet 136 may be provided with a constricted inlet orifice or nozzle structure.

The saturator 130 is additionally provided with a level sensor 142 which is a conventional device comprising a cylindrical outer tube which is ported to the lower interior of the saturator and contains a vertically slidable spherical float. The height of the float may be detected electromagnetically by sensing the vertical position of a metallic member supported by the float and extending above the top of the saturator receptacle 130.

The gassified liquid mix is vented from the saturator receptacle 130 through an outlet tube 144 under the propelling influence of the nitrous oxide gas head and into a freezing chamber 114 illustrated in FIG. 5.

The preferred freezing chamber 114 is a cylindrical chamber having an inlet at one of its ends which is connected to the saturator 112 and a outlet at its opposite end which is connected to a manually operable valve 150 for use in dispensing the frozen confection. The preferred freezing chamber 114 is further provided with a dasher 115 (FIG. 2) which is driven by a motor 152. Preferably the dasher 115 (FIG. 2) is formed with circularly spaced scrapers which scrape around the interior cylindrical wall of the freezing chamber 114 and with helically inclined impeller surfaces. The impeller surfaces push the frozen confection toward the outlet valve 150 while the entire dasher 115 (FIG. 2) mixes the frozen confection to circulate the outer colder mix into the interior and maintains its soft uniform consistency.

The freezing chamber 114 is cooled by a conventional freezer refrigeration unit 154 which supplies pressurized refrigerant into an evaporation chamber formed around the freezing chamber 114 in a conventional manner. The compressor of the refrigeration unit is in turn controlled by the control circuit 106. It should be noted however, that an embodiment of the invention may be operated with a single refrigerant compressor and reservoir which may supply pressurized refrigerant for cooling both the refrigerated enclosure 102 as well as the freezing chamber 114.

Desirably, the compressor motor of the refrigeration apparatus 154 is controlled by a pair of series connected thermostats 114a, 114b one thermostat 114a positioned near the inlet of the freezing chamber 114 and one positioned relatively the other thermostat 114b nearer its outlet end. The thermostat near the outlet end is preset to a selected temperature, such as 12 degrees, which is a substantially lower temperature than the thermostat which is positioned near the inlet end and which is set for example to 26 degrees F.

The temperature selected for the outlet end is selected primarily on the basis of the desired consistency and flow characteristics of the frozen mix as it is dispensed. The temperature selected for the inlet end may be lower for longer freezer chambers and higher for shorter ones in order to avoid steep temperature gradients.

This temperature control system recognizes the fact that, while it is necessary for the product near the outlet end to be at the desired freezing temperature because it is the product which will be next dispensed, the mix which has just entered the freezing chamber 114 need only be at a temperature which is sufficient to deter bacterial growth.

The refrigeration unit 154 is provided with an expansion valve which controllably admits refrigerant into the evaporation chamber in response to the temperature of the refrigerant existing from the evaporation chamber in order to provide the desired temperature.

An advantage of controlling the freezing chamber in the manner described is that operation and cycling of the freezer compressor 154 is minimized since the compressor is not required to continue operating until the most recently inserted mix is cooled to 12 degrees. Instead the freezer compressor 154 may cease operation when the inlet temperature is lowered beyond 26 degrees.

Figure 7:
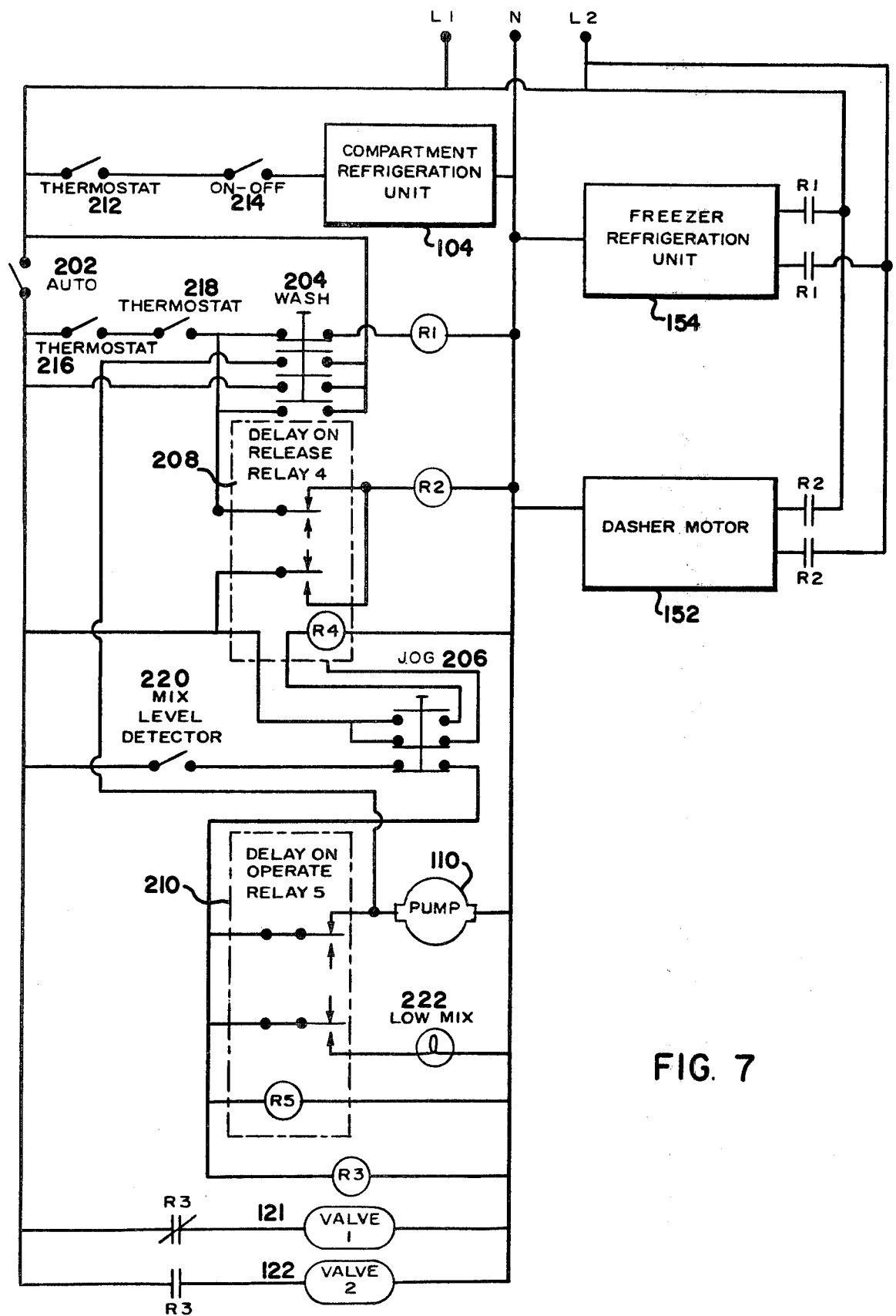
FIG. 7 is a schematic diagram of the control circuitry utilized in the embodiment of the invention which is illustrated in FIG. 5

The control circuitry for the preferred embodiment of the invention is illustrated in FIG. 7. In addition to the components of the preferred embodiment which are illustrated in FIG. 5, it also has: a single pole, single throw automatic switch 202 which functions to initiate the automatic operation of the unit upon being closed; a wash switch 204 which comprises four ganged, single pole, single throw switches the function of which is to permit manual initiation of the wash cycle upon its being switched to its depressed state; and a Jog switch 206 comprising three spring biased ganged, single pole, single throw switches which functions to initiate operation of the dasher motor 152 for a 30 second interval.

The "Automatic" switch 202 and the wash switch 204 are mechanically interconnected with a lockout mechanism so that the "Automatic" switch 202 is opened by activation of the wash switch 204.

The control circuit also utilizes a pair of time delay relays 208 and 210 which are conventional, commercially available devices. Delay relay 208 is a delay on release relay which is normally in the position illustrated but which switches to its other state upon the application of electrical energy to its input R4 and remains in this other state for 30 seconds after the deenergization of its input R4. The delay relay 210 is a delay on operate relay which is normally in its illustrated state and which switches to its other state between 10 and 15 seconds after the application of energy to its input R5 and remains in its other state until its input R5 is deenergized.

The control circuit further has a conventional thermostat 212 for sensing and controlling the temperature in the refrigerated enclosure 102. The thermostat 212 is series connected to an on-off switch 214. Thermostat switches 216 and 218 sense the temperature of the opposite ends of the freezing chamber 114. The control circuit additionally has conventional relays R1 for controlling the freezer refrigerator unit 154, R2 for controlling the dasher motor 152 and R3 for controlling the solenoid actuated metering valves 121 and 122.

The single pole, single throw switch 220 is the level detector switch associated with the level sensing device 142 illustrated in FIG. 6. It closes when the mix level in the saturator 112 falls below a selected level. Desirably an indicator lamp 222 is illuminated upon detection of this low mix condition.

During the normal manufacturing operation of the preferred embodiment of the invention illustrated in FIG. 7, the on-off switch 214 is closed to permit the thermostat 212 to control the refrigeration unit 104 thereby maintaining approximately 34 degrees within the refrigerated enclosure 102.

The automatic switch 202 is also manually closed permitting the series connected freezing chamber thermostats 216 and 218 to control the freezer refrigeration unit 154 by current flowing through the wash switch 204 and the relay R1.

Each time the freezing chamber thermostats 216 and 218 close to energize the relay R1, they simultaneously energize the relay R2 through the normally closed contacts of the time delay relay 208. Energization of relay R2 causes simultaneous operation of the dasher motor 152. Consequently the dasher motor is operated each time the freezing chamber 114 is cooled.

If, during normal manufacturing operation, the mix level detector switch 220 closes because of the dispensing of frozen confection and the venting of gassified mix into the freezing chamber, the input R5 of the delay on operate relay 210 is energized.

Since time delay relay 210 is a delay on operate relay, its internal, normally closed contacts will initially energize the pump 110 until either the level detector switch 220 again opens in response to a filled saturator 112 or the delay relay 210 completes its timing cycle and switches to its other state.

If the saturator has not been filled within this time delay the low mix indicator light 222 will be illuminated to signal an insufficiency of the mix quantity. Consequently, the time delay for relay 210 must be selected to be slightly greater than the time required to fill the saturator with gassified mix and open the mix level detector switch 220.

Simultaneously with the closing of the mix level detector switch 220, relay R3 is energized to deenergize the solenoid of valve 121 and thereby close valve 121. Simultaneously, valve 122 is opened to permit a metered quantity of Freon to be inserted in the pipe which is intermediate these valves. Upon opening of the mix level detector switch 220, valve 121 opens and valve 122 closes to expell the metered quantity of Freon into the saturator.

If a period of time has elasped since the dasher motor 152 has operated, the pressure head within the saturator 112 will be insufficient to force frozen confection through the valve 150. Consequently, a rotation of the dasher is required to aid in the impelling of the frozen confection and to stir and soften it. Consequently, unless freezing chamber thermostat switches 216 and 218 coincidentally happen to be operating the dasher motor 152, an operator may depress the jog switch 206. Such depression energizes time delay relay 208 which immediately switches to its other state thus energizing relay R2 and in turn the dasher motor 152. It may be further noted that depression of the jog switch 206 further disables the mix level detector switch 220.

In order to thoroughly wash and cleanse the preferred embodiment of the invention, an operator withdraws the mix container 108 from the refrigerated enclosure 102 and substitutes a container of an approved sanitizing solution. The wash switch 204 is then switched to its depressed state thereby preventing energization of the relay R1 and operation of the freezer refrigerating unit 154. The wash switch 204 further continuously supplies energy to the relay R2 to permit continuous dasher motor operation and also to the pump 110 to permit continuous pump operation. The wash switch 204 additionally bypasses the automatic switch 202 so that the wash cycle occurs regardless of the state of the automatic switch 202.

It is to be understood that while the detailed drawings and specific examples given describe a preferred embodiment of the invention, they are for purposes of illustration only, that the apparatus of the invention is not limited to the precise details and conditions disclosed and that various changes may be made without departing from the spirit of the invention which is defined by the following claims.

What is claimed is:

1. A closed flow through apparatus for the continuous preparation of a frozen dairy-type confection, the apparatus comprising:

(a) A mix receptacle for containing a liquid confection mix;
    (b) a pump means connected to said mix receptacle for projecting mix from said mix receptacle into a saturator;
    (c) a saturator comprising an enclosed receptacle connected to said pump for atomizing and gassifying said mix;
    (d) a source of pressurized gas connected in communication with said saturator for continuously applying a pressure head upon the interior of said saturator;
    (e) a refrigerated freezing chamber having a dasher, a valved outlet and an inlet connected to said saturator for receiving gassified mix propelled by said pressure head;
    (f) refrigeration apparatus for cooling at least said freezing chamber, and
    (g) a pressurized source of an edible refrigerant connected through a metering means to said saturator for periodically adding a selected quantity of said refrigerant to said mix.

2. An apparatus according to claim 1 wherein said freezing chamber is cylindrical with its inlet and outlet at its opposite ends and wherein said refrigerated apparatus is controlled by a pair of thermostat means, one positioned near each end of said freezing chamber, the one near the outlet end preset to a selected temperature substantially lower than the one near the inlet end for operating said refrigeration apparatus when both of said thermostat means are warmer than their preset temperature.

3. An apparatus according to claim 2 wherein said freezing chamber is provided with a motor driven dasher having its motor connected to a control means for actuating said motor simultaneously with the operation of said refrigeration apparatus.

4. An apparatus according to claim 3 wherein said saturator is provided with a level sensor connected to said control means, said control means also connected to said pump and said metering means for actuating said pump and said metering means in response to a low mix level in said saturator.

5. An apparatus according to claim 4 wherein said control means is further provided with a switch means for permitting manual actuation of said dasher motor.

6. An apparatus according to claim 4 wherein said control means further includes a wash switching means for disabling said refrigeration means and for continuously operating said dasher motor and said pump to permit a wash cycle of operation.

* * * * *